Jan. 15, 1957  D. A. PARKER  2,777,713
RAISABLE TRAILER DRAWBAR
Filed March 29, 1954  4 Sheets-Sheet 1
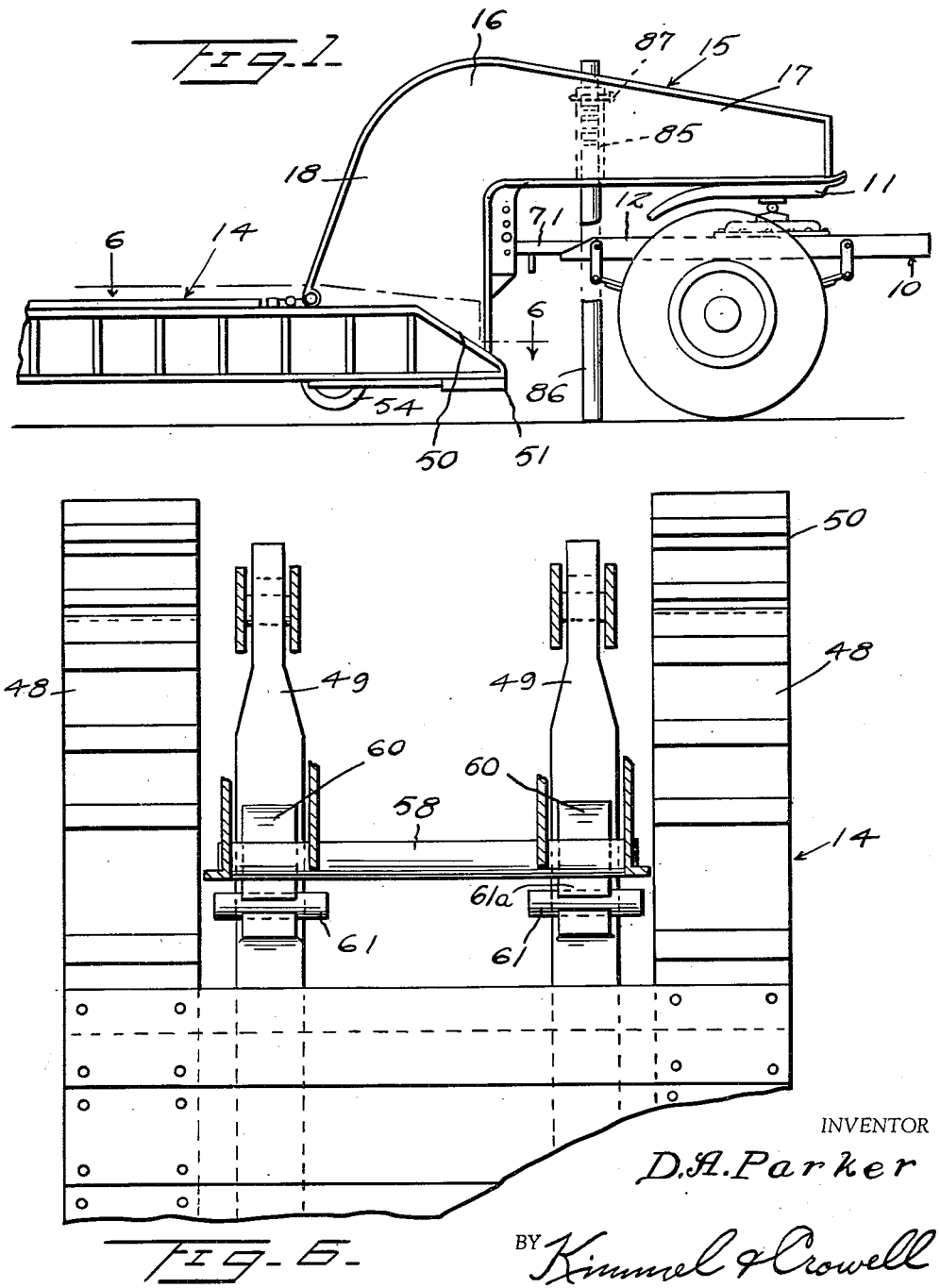
INVENTOR
D. A. Parker
BY Kimmel & Crowell
ATTORNEYS

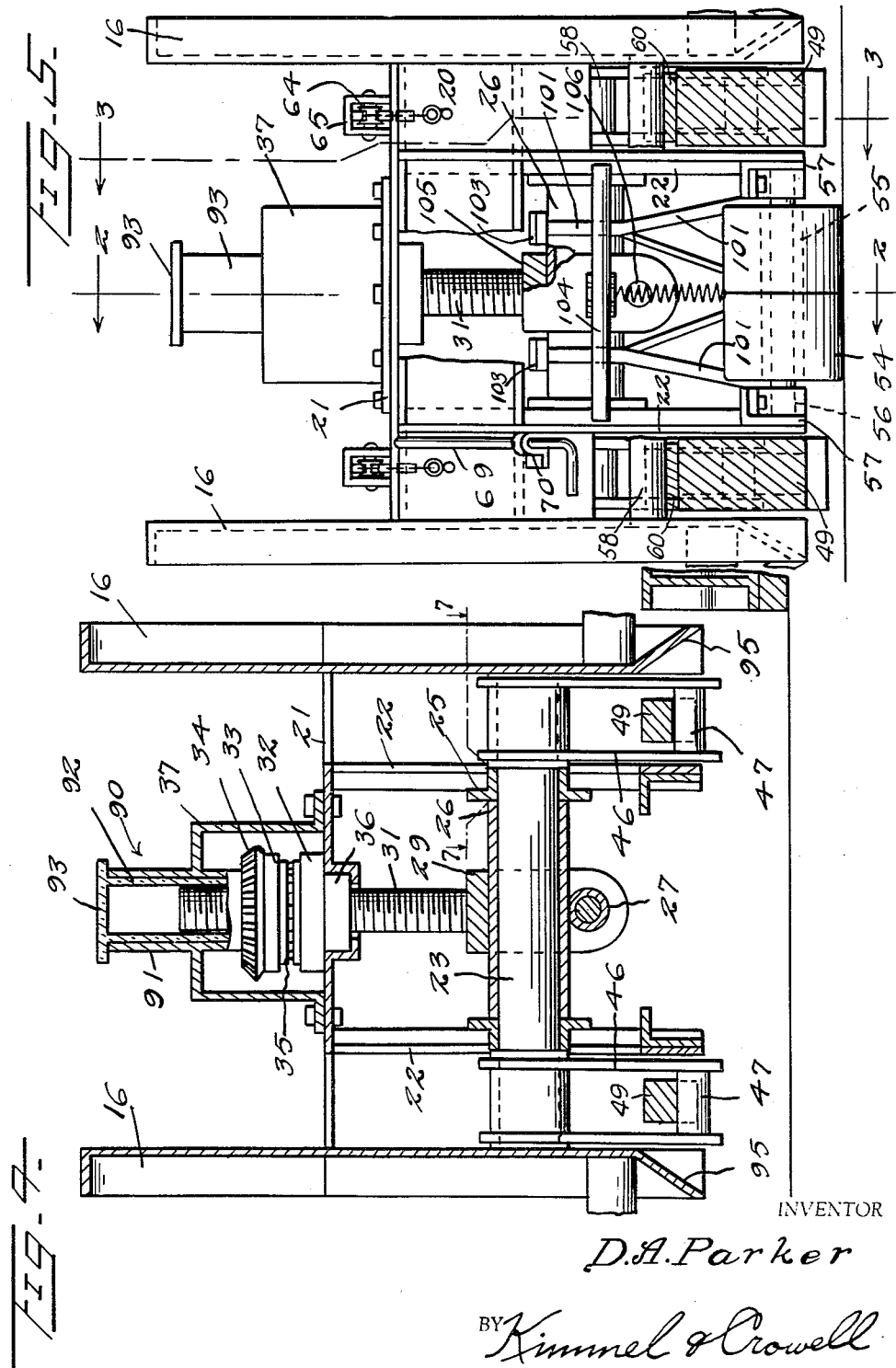

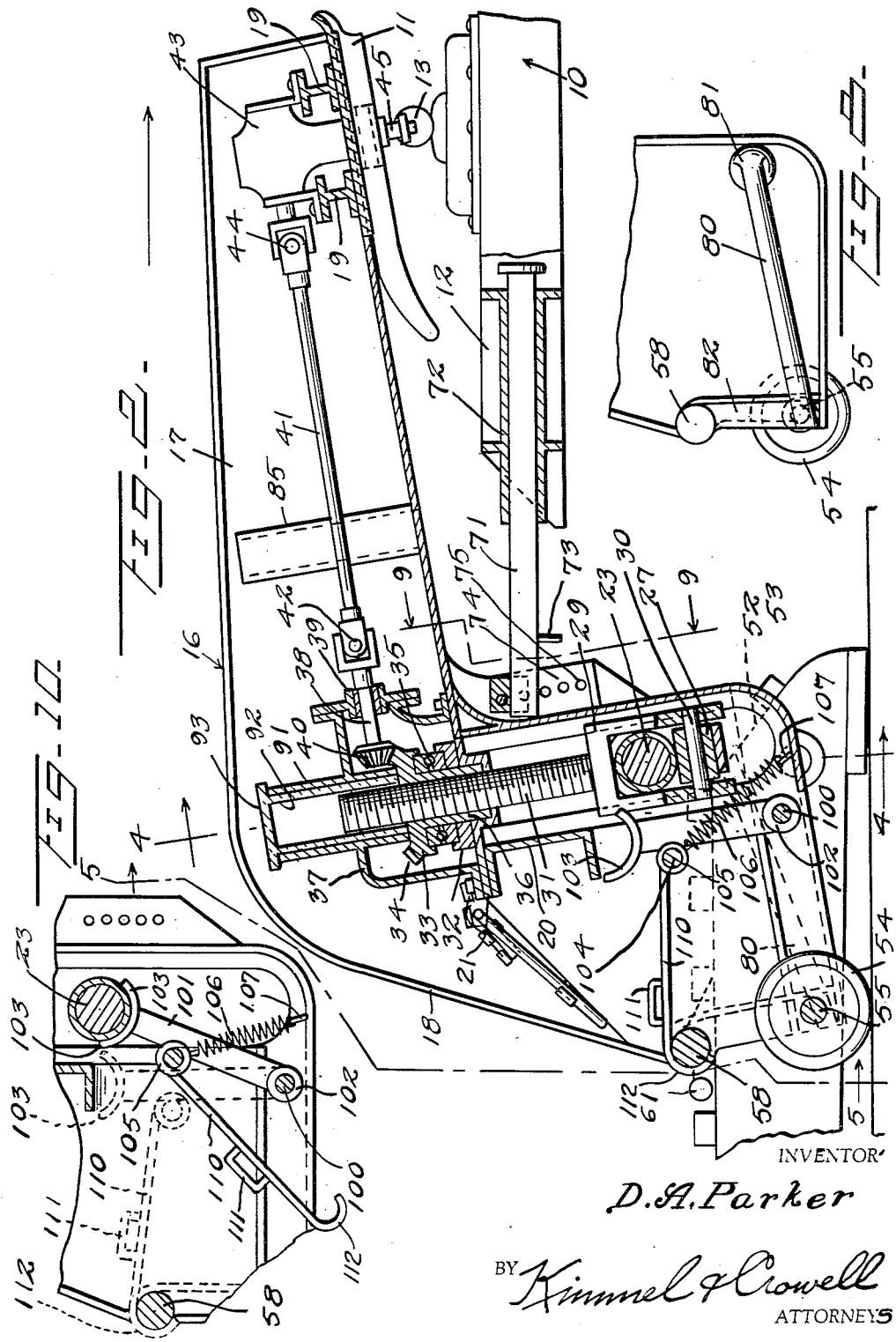

Jan. 15, 1957 D. A. PARKER 2,777,713
RAISABLE TRAILER DRAWBAR
Filed March 29, 1954 4 Sheets-Sheet 4
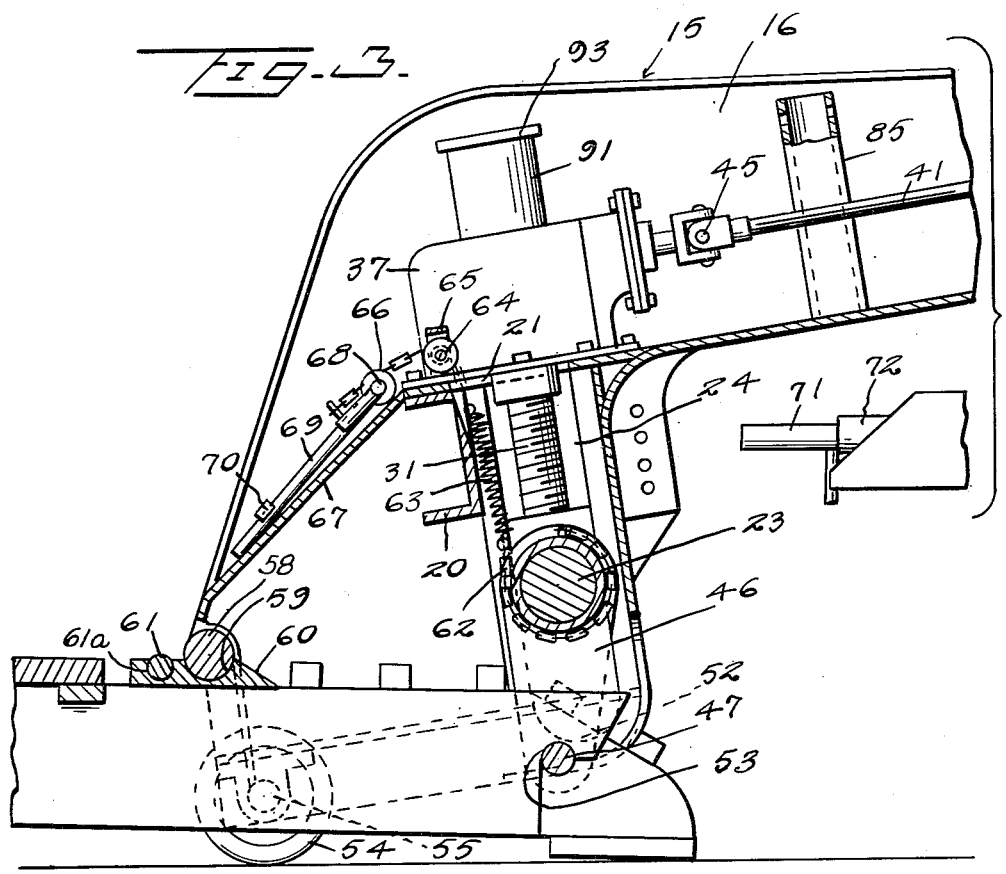
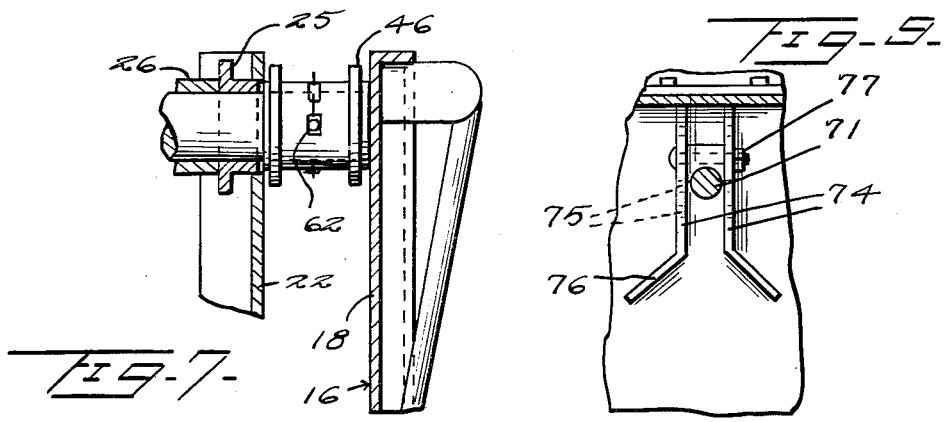
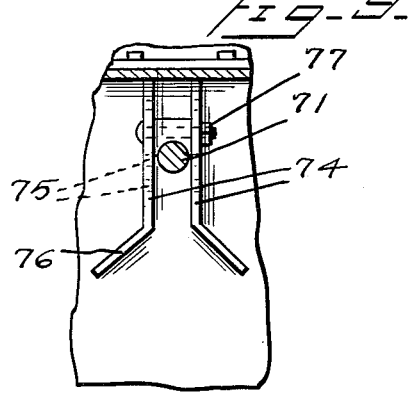
INVENTOR
D. A. Parker
BY Kimmel & Crowell
ATTORNEYS

United States Patent Office 2,777,713
Patented Jan. 15, 1957

2,777,713

RAISABLE TRAILER DRAWBAR

Dean Austin Parker, Richmond, Mich.

Application March 29, 1954, Serial No. 419,500

2 Claims. (Cl. 280—425)

This invention relates to a gooseneck coupling between a tractor vehicle and a low slung trailer.

An object of this invention is to provide a gooseneck or inverted L-shaped drawbar which forms a coupling between a tractor vehicle and a low slung trailer and which is so constructed and arranged that the drawbar may be detached from or connected with the trailer.

Another object of this invention is to provide in combination a detachable drawbar and trailer which will permit lowering of the trailer to a loading or unloading position or raising of the forward end of the trailer to a moving position.

A further object of this invention is to provide a detachable drawbar which includes traction wheels for permitting shifting of the tractor with attached drawbar and with the latter uncoupled from the trailer.

A further object of this invention is to provide a drawbar structure which includes means operative from the tractor vehicle for effecting coupling or uncoupling of the drawbar from the trailer and for raising or lowering the front end of the trailer.

Another very important object of this invention is the provision of an improved safety stop serving positively to prevent disengagement of the tractor and trailer in towing position.

A further important object of the invention is the provision of an improved structure which overcomes certain disadvantages encountered in my prior Patent No. 2,667,282, dated January 26, 1954.

A still further object of the invention is the provision of an improved height gauge whereby the relative height to which the trailer is raised may be determined at a glance, and whereby the relative angular arrangement thereof may also be determined.

A still further object of the invention is the provision of an improved guide bar and guide therefor for the alignment of the tractor and trailer.

A further object of the invention is the provision of means for supporting the drawbar connection at a desired height in power-off position.

A further object of the invention is the provision of an improved combined stop and rear cross shaft bearing.

With the above and other objects in view, my invention consists in the arrangement, combination and details of construction disclosed in the drawings and specification, and then more particularly pointed out in the appended claims.

In the drawings:

Figure 1 is a detail side elevation partly broken away of a drawbar and low slung trailer constructed according to an embodiment of this invention.

Figure 2 is a longitudinal section taken on the line 2—2 of Figure 5.

Figure 3 is a vertical section taken substantially on the line 3—3 of Figure 5.

Figure 4 is a sectional view taken on the line 4—4 of Figure 2.

Figure 5 is a sectional view taken on the line 5—5 of Figure 2, with parts broken away for clarity.

Figure 6 is a fragmentary sectional view taken on the line 6—6 of Figure 1.

Figure 7 is a fragmentary sectional view taken on the line 7—7 of Figure 4.

Figure 8 is a fragmentary side elevation of the drawbar.

Figure 9 is a fragmentary sectional view taken substantially along the line 9—9 of Figure 2 disclosing the improved guide yoke.

Figure 10 is a fragmentary constructional detail showing the safety stop mechanism of Figure 2 in a different position of adjustment.

Figure 11 is a detail side elevation of the cross shaft bearing block and stop.

Referring to the drawings the numeral 10 designates generally a tractor vehicle of conventional construction which is provided with a fifth wheel 11 and includes a frame 12. In Figure 1 the rear portion of the tractor Figure 10 is disclosed and a fifth wheel 11 is rockably mounted as at 13 on horizontally disposed pivot means. A low slung trailer member generally designated as 14 is disposed at the rear of the tractor vehicle 10 and is adapted to be connected with the tractor 10 by means of a detachable drawbar as will be hereinafter described.

A drawbar structure generally designated as 15 is pivotally connected with the fifth wheel 11 in a conventional manner, and the drawbar structure 15 includes a main frame structure formed of a pair of inverted L-shaped members 16. The L-shaped members 16 have a substantially horizontal upper side 17 and a depending rear side 18. There are two of these L-shaped members 16 which are connected together at their forward ends by means of connecting I beam members 19 and are connected together at their rear portions by means of a rear channel beam 20.

A plate 21 is secured to the upper side of the channel beam 20 and is fixed between the rear sides 18 of the frame members 16 and a pair of inner frame members 22 are secured to the plate 21 and to the beam 20. The inner frame members or plates 22 are spaced inwardly from the webs of the rear frame members 18, the purpose for which will be hereinafter described. A horizontally disposed vertically movable shaft 23 is disposed between the rear sides 18 and is vertically movable in vertically disposed slots or guides 24 which are formed in the inner frame members 22. The shaft 23 has a pair of flanged collars 25 rotatably disposed thereon which loosely engage in the guide slots 24, and the collars 25 are held against inward movement by means of sleeve 26 which is fixedly secured as by welding or the like to the shaft 23.

A sleeve or bearing member 27 is disposed transversely across the lower side of the shaft 23 midway between the ends thereof.

An inverted U-shaped clevis 29 engages about the shaft 23 and a pin or pivot member 30 engages through the arms of the clevis 29 and through the bearing member or sleeve 27 so as to thereby connect the clevis 29 to the shaft 23. The clevis 29 has fixedly secured thereto an upwardly extending threaded jack shaft 31. The jack shaft 31 rotatably engages through a bearing 32 which is carried by the plate 21. A nut 33 is threaded on the shaft 31 and is formed with a bevel spur gear 34.

A thrust bearing 35 is disposed between the bearing 32 and the nut 33, and preferably the nut 33 includes a relatively long sleeve 36. A housing 37 is secured to the plate 21 and engages about the shaft 31 and gear 34. A stub shaft 38 is journalled in a bearing 39 carried by the housing 37 and has a bevel gear 40 secured thereto which meshes with the gear 34. A shaft 41 extends between the frame members 16 and is connected with the stub shaft 38 by means of a universal joint 42.

The shaft 41 is connected with a gear box 43 through a second universal joint 44, and gear box 43 is secured to the connecting I beam members 19 and includes a shaft 45 extending downwardly through the fifth wheel 11 and adapted to be connected in a conventional manner with the power take-off of the tractor vehicle.

The shaft 23 has fixed thereto adjacent the opposite ends thereof a pair of clevises 46 which include a connecting pin 47.

Referring now to Figure 6, the trailer 14 includes a pair of parallel forwardly extending frame members 48 and a pair of forwardly projecting hooks or keepers 49 which are positioned between the frame extension members 48.

The frame extension members 48 are provided with downwardly inclined forward ends 50, and a shoe 51 is secured to the lower side of each frame extension member 48. The inclined forward portions 50 provide the track at the forward end of the trailer 14 so that when the forward end of the trailer is lowered with the shoes 51 engaging with the ground or road, the article which is to be loaded onto the trailer may be moved upwardly over the inclined track 50. Each keeper or hook 49 is formed with a downwardly and rearwardly inclined nose 52 and an arcuate keeper slot 53 within which pin 47 is adapted to releasably engage. Drawbar 15 has secured to the lower rear portions of the inner frame members 22 a pair of wheels 54 which are rotatably mounted on a shaft 55 carried by bearings 56.

The bearings 56 are secured to angle members 57 which are fixed to the inner sides of the plates or inner frame members 22. The rollers or wheels 54 project downwardly a slight distance below the lower rear end of the drawbar 15 and are adapted to engage the ground or road when the drawbar 15 is uncoupled from the trailer or when the trailer 14 has been lowered to a loading or unloading position. A relatively heavy cross shaft 58 is secured between the side members 18 of the drawbar at the rear of the side members 18, and the outer ends of shaft 58 engage in a bearing 59 formed in a plate 60. Each plate 60 has fixed thereto a stop 61, as shown in Figure 6, which is engaged by the rear of the drawbar when the drawbar is being coupled with respect to the trailer 14.

The bearings 59 with the plates 60 provide a fulcrum by means of which the drawbar structure 15 is adapted to be rocked relative to the trailer 14 for elevating or lowering the trailer and the drawbar structure. The stop members 61 are spaced rearwardly of their associated cross bar, engaging recesses 61a, thus obviating strain thereon during normal usage. The stop members 61 extend on both sides of the plates 60 and engage the rear of the drawbar during coupling to align the shaft 58 with the bearings 59 to prevent overrunning.

In order to provide a means whereby the clevises 46 may be yieldably urged to a coupling position a pair of chains 62 are secured to the shaft 23 adjacent the outer end portions thereof, and a spring 63 is interposed in each chain 62. Each chain 62 engages over a grooved roller 64 rotatably mounted through an inverted U-shaped member 65 which is secured to the upper side of the plate 21. A shaft 66 is rotatably carried by a downwardly and rearwardly inclined plate 67 which is secured to an outer frame member 16 and an adjacent inner frame member 22. The shaft 66 has fixed thereto a lever or arm 68, and a crank lever 69 is also secured to the shaft 66 and is adapted to engage a latch hook 70 carried by one of the plates 67. The chain 62 is partly wound about the shaft 23 as shown in Figure 3, and when the crank 69 is in locked position as shown in Figure 3 the shaft 23 is yieldably urged to rotate in a clockwise direction.

When the clevises 46 are to be uncoupled from the keeper members or hooks 49 the crank 69 is raised upwardly to release the tension on the chains 62 in order that the clevises 46 may gravitatingly swing downwardly to substantially vertical position. It will be understood that when the crank 69 is raised upwardly to a released position the jack shaft 31 will then be lowered to disengage the locking pins 47 from the keepers 53.

In order to provide a means whereby the drawbar structure 15 will be held in alignment with the tractor vehicle 10 during the coupling of the drawbar with the trailer 14, I have provided an extensible shaft 71 which is slidable in a guide sleeve 72 carried by the frame 12 of the tractor 10.

Shaft 71 is comprised of a bar of solid stock and is provided with a handle 73. The end of the bar is adapted to fit between a pair of plates 74 provided with a series of apertures 75, and outwardly flared at their lower extremities as indicated at 76 to provide a suitable guide for the bar 71.

A pin 77 is adapted to be inserted between a selected pair of apertures to limit the upward travel of the bar 71.

Having reference now to Figure 8 there is indicated a reinforcing means for the shaft 55 which includes a member 80 of bar stock, which engages a cross bar 81, and which is in turn fixed to the bracket 82 engaging the shaft 58, thus firmly and securely mounting the wheels without undue strain thereon.

Means are provided for supporting the trailer in level position when desired, and take the form of oppositely disposed sockets 85 positioned adjacent the side plates 16 for the accommodation of supporting members or posts 86, which may be secured in position as by means of pins 87 passed through a suitable aperture in the post and suitable selected pairs of apertures in the sockets 85. By this means the trailer drawbar may be held at a desired selected height.

Having reference now to the height gauge generally indicated at 90 it will be seen that the same is comprised of an outer tube 91, which may or may not be transparent as desired, within which is positioned telescopically an inner transparent tube 92. The tube 92 is provided with a closure cap 93 of a greater diameter than the external tube 91 for the purpose of precluding the entrance of moisture or the like into the tube and the interior mechanism.

The arrangement is such that when the trailer is normally in position, that is, loaded and level, the top of shaft 31 touches the top of elescoping inner tube 92, thus indicating the level position. Upon moving the trailer upwardly out of level position the inner tube may slide upwardly within the outer tube, and thus the position of the trailer as to whether level or above level is clearly indicated.

It is to be noted that the lower sides of outer plate 16 are outwardly flared as at 95 to provide end pockets which are substantially self-cleaning, and which also provide greater rigidity in construction.

Having reference now to the safety stop mechanism, and more particularly to Figures 2, 5, and 10, it is noted that there is provided upwardly of the rear cross shaft, a stop shaft 100 upon which are mounted a pair of lever members 101. The shaft 100 is suitably mounted in journals 102 in inner wall members 22 for free rotation therein, and each of the lever arms 101 carries at its upper extremity an arcuate shoe 103 adapted to engage normally under shaft 23 when the latter is in raised position, or level, to preclude possible slippage and disengagement thereof.

The levers 101, and consequently the shoes 103, are normally biased toward the shaft 23 by means of a safety bar 104 which is provided with a centrally positioned collar 105 to which is attached a spring 106, the opposite end of which is suitably attached to a lug 107 carried by the frame. The ends of bar 104 bias the levers 101 constantly towards engagement with the shaft 23.

When the jack screw has raised the shaft 23 to sufficient height to enable the shoes 103 to slip thereunder, the shaft is automatically held against downward movement until manually moved. Such manual movement may be effected by means of a member 110 provided with a hand hold 111, a hook 112 thereon, when engaged over rear cross shaft 58, serving to hold the shoes 103 out of engagement with the shaft 23, whereupon the trailer may be readily lowered to inoperative position and the parts disengaged.

From the foregoing it will now be seen that there is herein provided an improved trailer hitch and a safety stop therefor which will facilitate the loading and unloading of the trailer, and will further provide a means whereby the trailer and tractor may be securely locked against any possible disengagement.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In combination, a tractor vehicle having a fifth wheel, a trailer, an inverted L-shaped drawbar having a forward end attached to said fifth wheel, reciprocably slidable movable means mounted on said drawbar for vertical movement with respect thereto, whereby said movable means may assume various heights above the ground, actuating means comprising a jack screw secured to said movable means, a nut threadably engaging said jack screw, and means for rotating said nut, said last-mentioned means comprising a power take-off means on said tractor vehicle and means drivingly connecting said nut with said power take-off means, said actuating means being adapted for raising or lowering said movable means, and coupling means for connecting the forward end of said trailer to said movable means, whereby the height of said trailer forward end may be varied, said movable means including a cross bar raisable by said jack screw and safety stop means for holding said cross bar in raised position, said means including a pivoted shaft, lever means secured to said shaft and arcuate shoes on said lever means engaging under said cross bar, and spring means normally biasing said shoes to lever engaging position.

2. In combination, a tractor vehicle having a fifth wheel, a trailer, an inverted L-shaped drabar having a forward end attached to said fifth wheel, reciprocably slidable movable means mounted on said drawbar for vertical movement with respect thereto, whereby said movable means may assume various heights above the ground, actuating means comprising a jack screw secured to said movable means, a nut threadably engaging said jack screw, and means for rotating said nut, said last-mentioned means comprising a power take-off means on said tractor vehicle and means drivingly connecting said nut with said take-off means, said actuating means being adapted for raising or lowering said movable means, and coupling means for connecting the forward end of said trailer to said movable means, whereby the height of said trailer forward end may be varied, said movable means including a cross bar raisable by said jack screw and safety stop means for holding said cross bar in raised position, said means including a pivoted shaft, level means secured to said shaft and arcuate shoes on said lever means engaging under said cross bar, and spring means normally biasing said shoes to lever engaging position, and hook means for securing said levers and shoes out of cross bar engaging position.

References Cited in the file of this patent

UNITED STATES PATENTS

| | | |
|---|---|---|
| 1,217,320 | Lefferdink | Feb. 27, 1917 |
| 2,016,468 | Wagner | Oct. 8, 1935 |
| 2,667,282 | Parker | Jan. 26, 1954 |